US010089026B1

(12) United States Patent
Puhov et al.

(10) Patent No.: US 10,089,026 B1
(45) Date of Patent: Oct. 2, 2018

(54) VIRTUAL DRIVE BASED RAID GROUPS

(71) Applicant: EMC IP Holding Company LLC, Hopkinton, MA (US)

(72) Inventors: Peter Puhov, Shrewsbury, MA (US); Robert P. Foley, Clinton, MA (US); Jian Gao, Beijing (CN); Geng Han, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/393,859

(22) Filed: Dec. 29, 2016

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC .... G06G 3/0619; G06F 3/0665; G06F 3/0689
USPC .................................................. 711/114, 170
See application file for complete search history.

(56) References Cited

U.S. PATENT DOCUMENTS

| | | | |
|---|---|---|---|
| 6,567,889 B1 | 5/2003 | DeKoning et al. | |
| 6,857,059 B2 | 2/2005 | Karpoff et al. | |
| 7,409,625 B2 | 8/2008 | Corbett et al. | |
| 2004/0260967 A1 | 12/2004 | Guha et al. | |
| 2006/0075283 A1 | 4/2006 | Hartung et al. | |
| 2013/0132768 A1* | 5/2013 | Kulkarni | G06F 11/2094 714/6.22 |
| 2013/0290773 A1* | 10/2013 | Yoshihara | G06F 12/0246 714/6.21 |
| 2014/0258617 A1* | 9/2014 | Inoue | G06F 3/061 711/114 |
| 2015/0324145 A1* | 11/2015 | Akutsu | G06F 3/0617 711/114 |

* cited by examiner

*Primary Examiner* — Pierre Miche Bataille
(74) *Attorney, Agent, or Firm* — BainwoodHuang (57) ABSTRACT

Techniques are disclosed for using virtual drives to provide RAID groups in a data storage system. A pool of virtual drives is generated by i) dividing each one of a set of physical drives into multiple regions of physically contiguous non-volatile data storage, and ii) allocating individual regions of physically contiguous non-volatile data storage to corresponding virtual drives contained in a pool of virtual drives. RAID groups are then formed, where each one of the RAID groups is made up of a set of virtual drives assigned to the RAID group from the pool of virtual drives. One or more storage objects is then mapped to each RAID group, and host I/O operations received by the data storage system and directed to the storage object mapped to the RAID group are serviced using the set of virtual drives assigned to the RAID group.

19 Claims, 7 Drawing Sheets

VIRTUAL DRIVE BASED RAID GROUPS

TECHNICAL FIELD

The present disclosure relates generally to intelligent data storage systems, and more specifically to techniques for using virtual drives to provide RAID (Redundant Arrays of Independent Disks) groups.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify storage objects (e.g. logical disks or "LUNs") that are to be written, read, created, or deleted. The storage processors run software that manages incoming I/O operations and performs various data processing tasks to organize and secure the host data received from the host machines that is stored on the non-volatile data storage devices.

Some existing data storage systems have provided storage objects that are supported by RAID (Redundant Array of Independent Disks) technology. As it is generally known, RAID is a data storage virtualization technology that combines multiple physical disk drives into a single logical unit to provide data redundancy and/or performance improvement. The multiple physical drives combined to provide a RAID logical space are commonly referred to as a RAID "group". The number of disks in a RAID group is referred to as the "width" of the RAID group.

In a typical RAID group, all the physical drives in the group have the same capacity, and the entire capacity of each drive is consumed. The storage space within each physical drive is consumed in a uniform way, allowing a fixed formula to be used to conveniently calculate how data directed to the group is to be distributed onto the physical space of the drives in the group, based on a direct mapping between the RAID logical space and physical space on the disks that uses parameters such as RAID type, RAID group width, and the layout of RAID internal metadata.

SUMMARY

Previous data storage systems have exhibited significant shortcomings with regard to using RAID groups. For example, because the physical space of every drive in a RAID group is fully consumed, and because the capacity of each drive in the group must be identical, previous systems have required that when a physical drive fails it must be replaced by an entirely new physical drive, so that the RAID group can consume the identical space from the new drive as was consumed from the failed drive. The entire space in the new physical drive has had to be completely unconsumed at the time it is swapped into the group to replace the failed physical drive. Accordingly, each RAID group has had to maintain one or more completely unused spare physical drives to support its own failure recovery. The spare physical drives of one RAID group could not be use by any other RAID group. The full capacity of the spare physical drives has been wasted during normal operation, until the spares are needed to provide recovery from a physical drive failure.

Another shortcoming of previous systems is that in order to add capacity to a RAID group, previous systems have required that the minimum number of physical drives added to a RAID group be equal to the width of the group. Accordingly, to add capacity to a RAID group with a width of three (i.e. a group made up of three drives), three new physical drives had to be added to the group. Similarly, in order to add capacity to a RAID group with a width of five, five new physical drives had to be added to the group, and so on for other sizes of RAID groups. Expanding the capacity of a RAID group by adding only a single physical drive to the group has not been supported. This limitation can result in significant inefficiencies, especially as the total capacity of individual physical drives grows to tens of terabytes and even larger.

Another shortcoming of previous systems arises because a single drive failure has required that a RAID group must reconstruct the data from the failed physical drive onto a single spare physical drive, using exactly the same layout the data was stored on the failed drive. The rebuilding process included having the surviving members of the RAID group all write to a single new physical drive that is being spared into the group, in order to fill the new drive with data that exactly matches the format of the data that was stored on the failed drive. As a result, the performance limitations of the new drive with regard to performing write I/O operations per second (TOPS) is a bottleneck with regard to total rebuild time. Such bottlenecks can result in long rebuild times, during which the fault tolerance of the group is degraded, creating an increased risk of data loss. Such rebuild times increase as the total capacity of individual physical drives in the RAID group grows, adding to the significance of the problem.

To address these and other shortcomings of previous systems, new techniques are disclosed herein for using virtual drives to provide RAID groups in a data storage system, where the data storage system includes a storage processor and a set of physical drives communicably coupled to the storage processor. In the disclosed techniques, a pool of virtual drives is generated by i) dividing each one of the physical drives into multiple regions of physically contiguous non-volatile data storage, and ii) allocating individual regions of physically contiguous non-volatile data storage in the physical drives to corresponding virtual drives contained in the pool of virtual drives. One or more RAID groups are then formed from the pool of virtual drives. Each one of the RAID groups is made up of a set of virtual drives assigned to the RAID group from the pool of virtual drives. One or more storage objects are then mapped to each RAID group, and host I/O operations received by the data storage system and directed to the storage object mapped to the RAID group are serviced using the set of virtual drives assigned to the RAID group.

In another aspect of the disclosed techniques, forming at least one RAID group made up of the set of virtual drives assigned to the RAID group from the pool of virtual drives includes selecting the set of virtual drives assigned to the RAID group such that each one of the virtual drives in the set of virtual drives assigned to the RAID group is located on a different one of the physical drives.

In another aspect of the disclosed techniques, error counts are maintained on a per virtual drive basis, and individual virtual drives may be marked for end of life based on their error count exceeding a predetermined maximum number of errors.

In another aspect of the disclosed techniques, marking an individual virtual drive for end of life may cause i) a spare virtual drive to be assigned to the RAID group from the pool of virtual drives, ii) host data stored on the virtual drive marked for end of life to be copied to the spare virtual drive assigned to the RAID group, and iii) the RAID group to be rebuilt using the spare virtual drive as a member of the group.

In another aspect of the disclosed techniques, a failure of a physical drive in the set of physical drives may be detected. In response to detecting the failure of the physical drive, a number of virtual drives allocated from the failed physical drive may be determined, and that number of spare virtual drives may then be assigned from the pool of virtual drives to the RAID groups that included the virtual drives allocated from the failed physical drive, in order to replace the virtual drives allocated from the failed physical drive. The RAID groups that included the virtual drives allocated from the failed physical drive may then be rebuilt using the spare virtual drives.

In another aspect of the disclosed techniques, a new physical drive may be added to the set of physical drives. In response to the new physical drive being added to the set of physical drives, data may be migrated to new physical drive such that virtual drives are evenly distributed across the physical drives in the set of physical drives.

In another aspect of the disclosed techniques, the virtual drives may all be of the same size, but the physical drives in the set of physical drives may be of different capacities.

In another aspect of the disclosed techniques, a set of spare virtual drives is maintained in the pool of virtual drives for use by multiple RAID groups.

Embodiments of the disclosed techniques may provide significant advantages over previous approaches. For example, whole physical drives need not be wasted as unused spares for individual RAID groups, since spare virtual drives may be assigned as needed from the virtual drive pool to specific RAID groups as they are needed. In another example, in order to add capacity to a RAID group, with the disclosed techniques there is no requirement that the minimum number of physical drives added to a RAID group be equal to the width of the group, and the addition of individual drives may advantageously be supported. By monitoring errors on a per-virtual drive basis, the disclosed techniques allow for more accurate and finer grained steps in addressing errors than was possible in previous systems. And in another example, recovery from a single physical drive failure does not create a bottleneck with regard to performance limitations of a newly added physical drive, thus reducing the time during which the fault tolerance of the group is degraded, and reducing the risk of data loss.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the present invention is broader than the specific embodiments described below.

Figure 1:
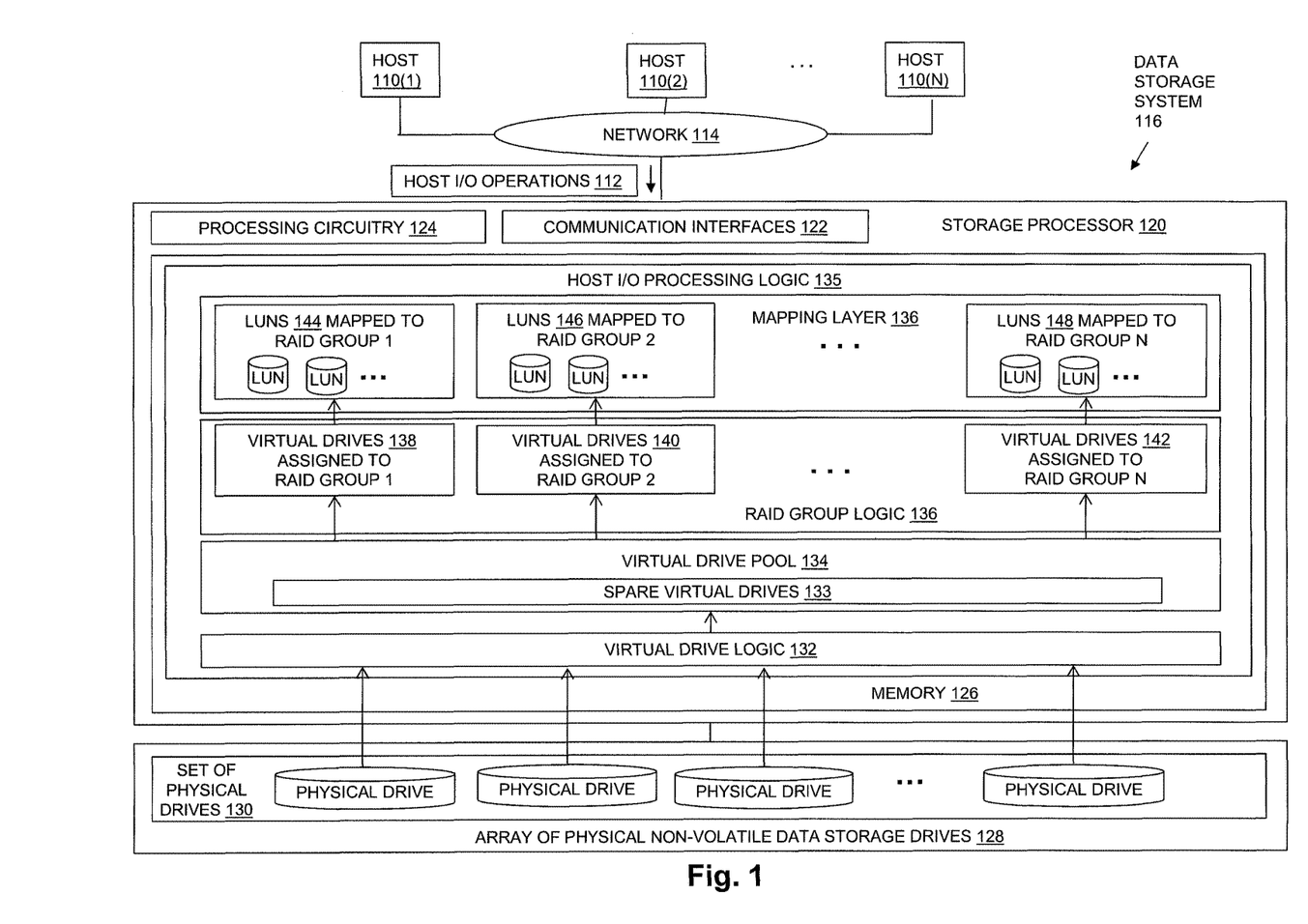
FIG. 1 is a block diagram showing an operational environment for the disclosed techniques, including an example of a data storage system in which the disclosed techniques are embodied.

FIG. 1 is a block diagram showing an operational environment for the disclosed techniques, including an example of a data storage system in which the disclosed techniques are embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations (e.g. host I/O read, host I/O write operations, create storage object operations, delete storage object, etc.).

The Array of Non-Volatile Data Storage Drives 128 may include magnetic disk drives, electronic flash drives, and/or optical drives. Array of Non-Volatile Data Storage Drives 128 may be directly physically connected to Storage Processor 120, or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is constructed and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, and various other applications, processes, etc.

During operation, Virtual Drive Logic 132 generates Virtual Drive Pool 134 by first dividing each one of the physical drives in the Set of Physical Drives 130 into multiple, equal sized regions of physically contiguous non-volatile data storage. For example, Virtual Drive Logic 132 may divide each one of five physical drives into five equal sized regions of physically contiguous non-volatile storage. The size of the regions of physically contiguous non-volatile storage into which the physical drives in the Set of Physical Drives 130 are divided is the same for every physical drive in the Set of Physical Drives 130. Any specific number of physical drives may be divided up into regions of physically contiguous non-volatile storage by Virtual Drive Logic 132 to generate Virtual Drive Pool 134. The physical drives in Set of Physical Drives 130 may each have the same total capacity, and may accordingly each be divided into the same number of regions. Alternatively, the physical drives in Set of Physical Drives 130 may have a variety of different capacities, resulting in different physical drives being divided into different numbers of regions.

After dividing each one of the physical drives in the Set of Physical Drives 130 into multiple, equal sized regions of physically contiguous non-volatile data storage, Virtual Drive Logic 132 allocates individual regions from the physical drives to corresponding virtual drives that are contained in Virtual Drive Pool 134. Accordingly, the specific region of non-volatile storage allocated to each specific virtual drive, and that is ultimately used to store the host data indicated by a host I/O write operation directed to the RAID (Redundant Array of Independent Disks) group to which that virtual drive is assigned, may be indicated by a mapping that is maintained between the virtual drive and the corresponding region of non-volatile storage allocated to the virtual drive from the physical drives contained in the Set of Physical Drives 130. Such mappings between virtual drives and regions of non-volatile storage allocated to the virtual drives may, for example, be maintained in Virtual Drive Logic 132, which generates the Virtual Drive Pool 134.

The Set of Physical Drives 130 from which Virtual Drive Pool 134 is generated may consist of all the physical non-volatile data storage drives in Array of Physical Non-Volatile Data Storage Drives 128, or only a subset of the physical non-volatile data storage drives in Array of Physical Non-Volatile Data Storage Drives 128. Accordingly, the disclosed techniques may be embodied such that Array of Physical Non-Volatile Data Storage Drives 128 includes multiple sets of physical drives, each of which may be used to independently generate a separate pool of virtual drives.

RAID Group Logic 136 is responsible for forming each one of the RAID Groups 1 through N, by assigning available virtual drives from Virtual Drive Pool 134 to specific ones of RAID groups 1-N. Each RAID group contains a number of virtual drives that are combined into a single logical unit for purposes of providing data redundancy and/or enhanced performance. Any specific level of RAID technology may be used with the disclosed techniques, such as, for example, RAID 0, RAID 1, RAID 2, RAID 3, RAID 4, RAID 5, and/or RAID 6, or any other specific type of RAID.

When forming each one of the RAID Groups 1-N, RAID Group Logic 136 requests a number of virtual drives from Virtual Drive Pool 134 that is equal to the width of the RAID group. Virtual Drive Pool 134 returns the requested number of virtual drives from Virtual Drive Pool 134 for assignment to the RAID group, while also ensuring that each one of the virtual drives assigned to a given RAID group is located on (i.e. allocated from) a different one of the physical drives in the Set of Physical Drives 130. Accordingly, each one of the Virtual Drives 138 assigned to RAID Group 1 is allocated from a different one of the physical drives in the Set of Physical Drives 130, each one of the Virtual Drives 146 assigned to RAID Group 2 is allocated from a different one of the physical drives in the Set of Physical Drives 130, and so on through Virtual Drives 142 assigned to RAID Group N, in which each one of the Virtual Drives 138 is also allocated from a different one of the physical drives in the Set of Physical Drives 130.

As shown in FIG. 1, Virtual Drive Pool 134 may include some number of Spare Virtual Drives 133. Spare Virtual Drives 133 may include all virtual drives in Virtual Drive Pool 134 that are not assigned to a specific RAID group by RAID Group Logic 136. Accordingly, the spare virtual drives in Spare Virtual Drives 133 may be shared across all RAID Groups 1-N, and individual spare virtual drives may be dynamically assigned from Spare Virtual Drives 133 to any specific one of RAID Groups 1-N, as may be needed to replace individual virtual drives that have been marked for end of life due to experiencing large numbers of errors. Alternatively, individual spare virtual drives in Spare Virtual Drives 133 may be statically assigned to individual ones of the RAID Groups 1-N, for exclusive use by the RAID group to which they are assigned.

Mapping Layer 136 maps storage objects that are written, read, created, and/or deleted by Host I/O Operations 112, such as logical disks referred to as "LUNs", to individual ones of the RAID Groups 1-N. Mapping Layer 136 may also map locations within each storage object to corresponding locations within the logical space provided by the RAID group to which the storage object is mapped. Accordingly, through the mapping performed by Mapping Layer 136, each received host I/O operation effectively indicates a storage object such as a LUN on which the operation is to be performed, and the RAID group containing the virtual drives corresponding to the regions of contiguous non-volatile data storage that ultimately store the data for that storage object. For example, each one of the LUNs 144 is mapped to the Virtual Drives 138 that are assigned to RAID Group 1, each one of LUNs 146 is mapped to the Virtual Drives 140 that are assigned to RAID Group 2, and so on through LUNs 148, which are mapped to the Virtual Drives 142 that are assigned to RAID Group N.

Host I/O Processing Logic 135 in Storage Processor 120 services Host I/O Operations 112 that read, write, create, and/or delete storage objects, using the virtual drives assigned to the RAID Groups 1-N. Host I/O Operations 112 are received from Hosts 110 and specify the individual storage objects that are to be read, written, created, or deleted, as well as specific locations within such storage objects. For example, each host I/O write operation may specify the storage object to be written, the data to be written to the specified storage object, and a location within the specified storage object at which the data is to be written. If the specified storage object is a LUN, the host I/O write operation may specify the location at which data is to be written within the LUN as an offset into the LUN. Similarly, a host I/O read operation may specify the location within the LUN from which data is to be read and returned to the requesting host as an offset into the LUN.

In order to service each one of Host I/O Operations 112, Host I/O Processing Logic 135 uses the virtual drives assigned to RAID Groups 1-N to identify the specific non-volatile storage on which the operation is to be performed. For example, for a given received host I/O operation, Host I/O Processing Logic 135 identifies the LUN to which the host I/O operation is directed from the host I/O operation itself, and then uses mappings between storage objects and RAID groups that are maintained in Mapping Layer 136 to identify the RAID group in RAID Groups 1-N to which that LUN is mapped. For example, in the case of a host I/O operation directed to one of LUNs 144, Host I/O Processing Logic 135 uses mappings between storage objects and RAID groups that are maintained in Mapping Layer 136 to identify RAID Group 1 as the RAID group to which the LUN is mapped. Host Processing Logic 135 then uses then uses RAID Group Logic 136 to identify the virtual drives assigned to the relevant RAID group, e.g. Host Processing Logic 135 then uses RAID Group Logic 136 to find the specific Virtual Drives 138 that were assigned from Virtual Drive Pool 134 to RAID Group 1.

Host I/O Processing Logic 135 then identifies the regions of non-volatile storage allocated to the virtual drives assigned to the relevant RAID group using mappings between those virtual drives and regions of non-volatile storage allocated to those virtual drives, e.g. as maintained by or in Virtual Drive Logic 132. Host I/O Processing Logic 135 then uses the identified regions of non-volatile storage to perform the specific requested host I/O operation (e.g. to read the requested data, persistently store the indicated host data, etc.). For example, Host Processing Logic then uses Virtual Drive Logic 132 to find the regions of contiguous non-volatile storage that were allocated to Virtual Drives 138 from the Set of Physical Drives 130, and performs the host I/O operation directed to one of LUNs 144 using those regions in the physical drives in the Set of Physical Drives 130.

Figure 2:
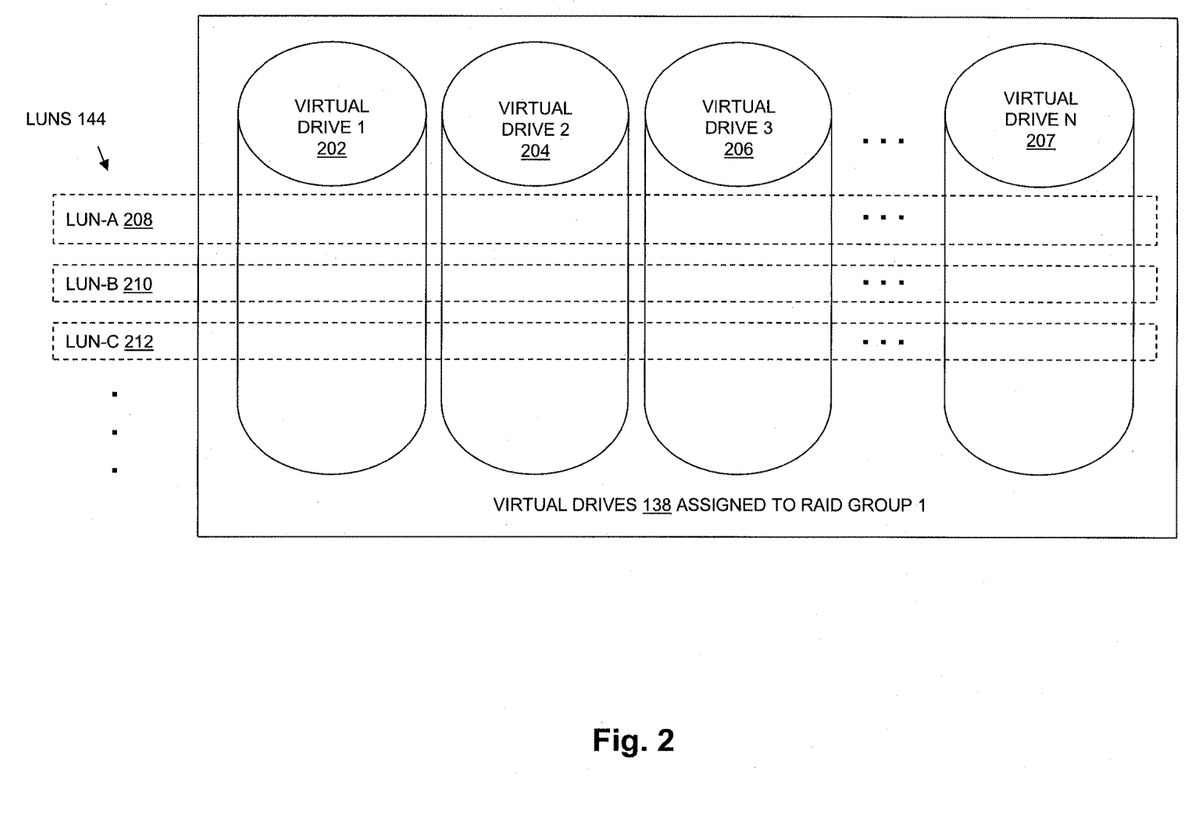
FIG. 2 is a block diagram illustrating allocation of data storage from virtual drives in a RAID group to multiple storage objects.

FIG. 2 is a block diagram illustrating allocation of data storage from the virtual drives in a RAID group to multiple LUN storage objects. In the example of FIG. 2, the Virtual Drives 138 assigned to RAID Group 1 include a number of virtual drives, shown by Virtual Drive 1 202, Virtual Drive 2 204, Virtual Drive 3 206, and so on through Virtual Drive N 207. LUNs 144 that are mapped to RAID Group 1 are shown to include LUN-A 208, LUN-B 210, LUN-C 212, and so on. As shown in FIG. 2, when data storage is allocated to a LUN from the Virtual Drives 144 that are assigned to RAID Group 1, data storage may be allocated to the LUN from each one of the Virtual Drives 138 that is assigned to in RAID Group 1, e.g. at the same locations within each virtual drive, so that LUN data can be redundantly stored across the Virtual Drives 138 assigned of RAID Group 1, in order to provide fault tolerance. Accordingly, when each one of LUN-A 208, LUN-B 210, and LUN-C 212 are mapped to RAID Group 1, data storage may be allocated from each of the Virtual Drives 138 that are assigned to RAID Group 1.

Figure 3:
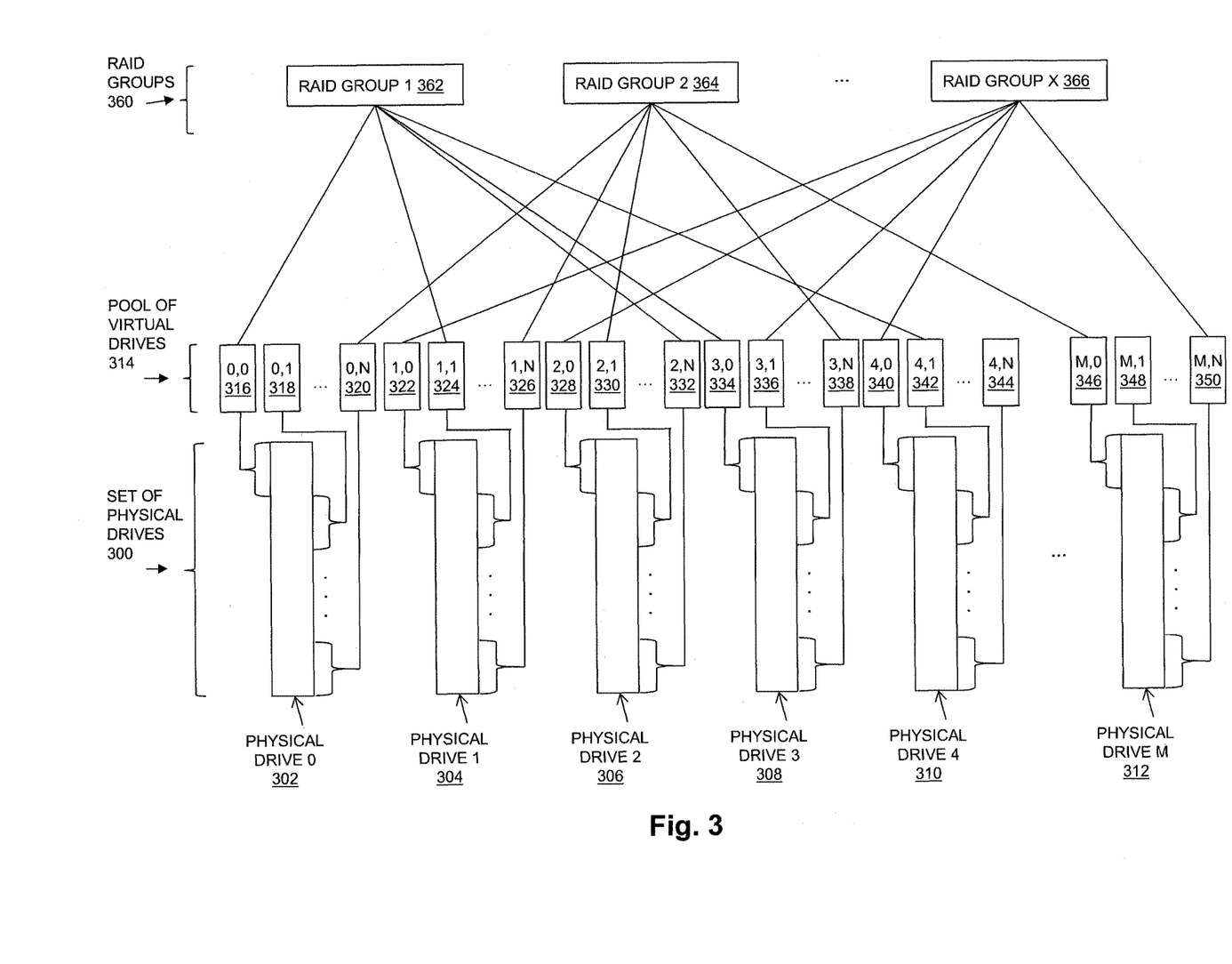
FIG. 3 is a block diagram illustrating generation of a pool of virtual drives from a set of physical drives, and further illustrating the formation of RAID groups from virtual drives in the pool of virtual drives.

FIG. 3 is a block diagram showing an example of a pool of virtual drives generated from a set of physical drives, and RAID groups formed from virtual drives in the pool of virtual drives. As shown in the example of FIG. 3, a Set of Physical Drives 300 may include Physical Drive 0 302, Physical Drive 1 304, Physical Drive 2 306, Physical Drive 3 308, Physical Drive 4 310, and so on through Physical Drive M 312.

Each physical drive in the Set of Physical Drives 300 is divided into multiple regions of physically contiguous non-volatile storage. Each one of the regions of physically contiguous non-volatile storage in any one of the physical drives is of the same size. The regions of physically contiguous non-volatile storage are allocated to corresponding virtual drives in the Pool of Virtual Drives 314. For example, the regions from Physical Drive 0 302 are allocated to virtual drive 0,0 316, virtual drive 0,1 318, through virtual drive 0,N 320. The regions from Physical Drive 1 304 are allocated to virtual drive 1,0 322, virtual drive 1,1 324, through virtual drive 1,N 326. The regions from Physical Drive 2 306 are allocated to virtual drive 2,0 328, virtual drive 2,1 330, through virtual drive 2,N 332. The regions from Physical Drive 3 308 are allocated to virtual drive 3,0 334, virtual drive 3,1 336, through virtual drive 3,N 338. The regions from Physical Drive 4 310 are allocated to virtual drive 4,0 340, virtual drive 4,1 342, through virtual drive 4,N 344, and so on through the regions from Physical Drive M 321, which are allocated to virtual drive M,0 346, virtual drive M,1 348, through virtual drive M,N 350.

At least some of the virtual drives in Pool of Virtual Drives 314 are assigned to RAID Groups 360. In the example of FIG. 3, each one of RAID Groups 360 has a width of five, i.e. five virtual drives are assigned to each one of the RAID Groups 360. For example, virtual drive 0,0 316, virtual drive 1,1 324, virtual drive 2,N 332, virtual drive 3,0 334, and virtual drive 4,1 342 are assigned to RAID Group 1 362. Virtual drive 0,N 320, virtual drive 1,N 326, virtual drive 2,1 330, virtual drive 3,N 338, and virtual drive M,0 346 are assigned to RAID Group 2 364. As also shown in FIG. 3, Virtual drive 1,0 322, virtual drive 2,0 328, virtual drive 3,1 336, virtual drive 4,0 340, and virtual drive M,N 350 are assigned to RAID Group X 366.

As shown in the example of FIG. 3, each virtual drive is assigned to only one RAID group, and the virtual drives assigned to a given RAID Group must each be allocated from a different physical drive, i.e. no two virtual drives assigned to a RAID group may be allocated from the same physical drive.

Figure 4:
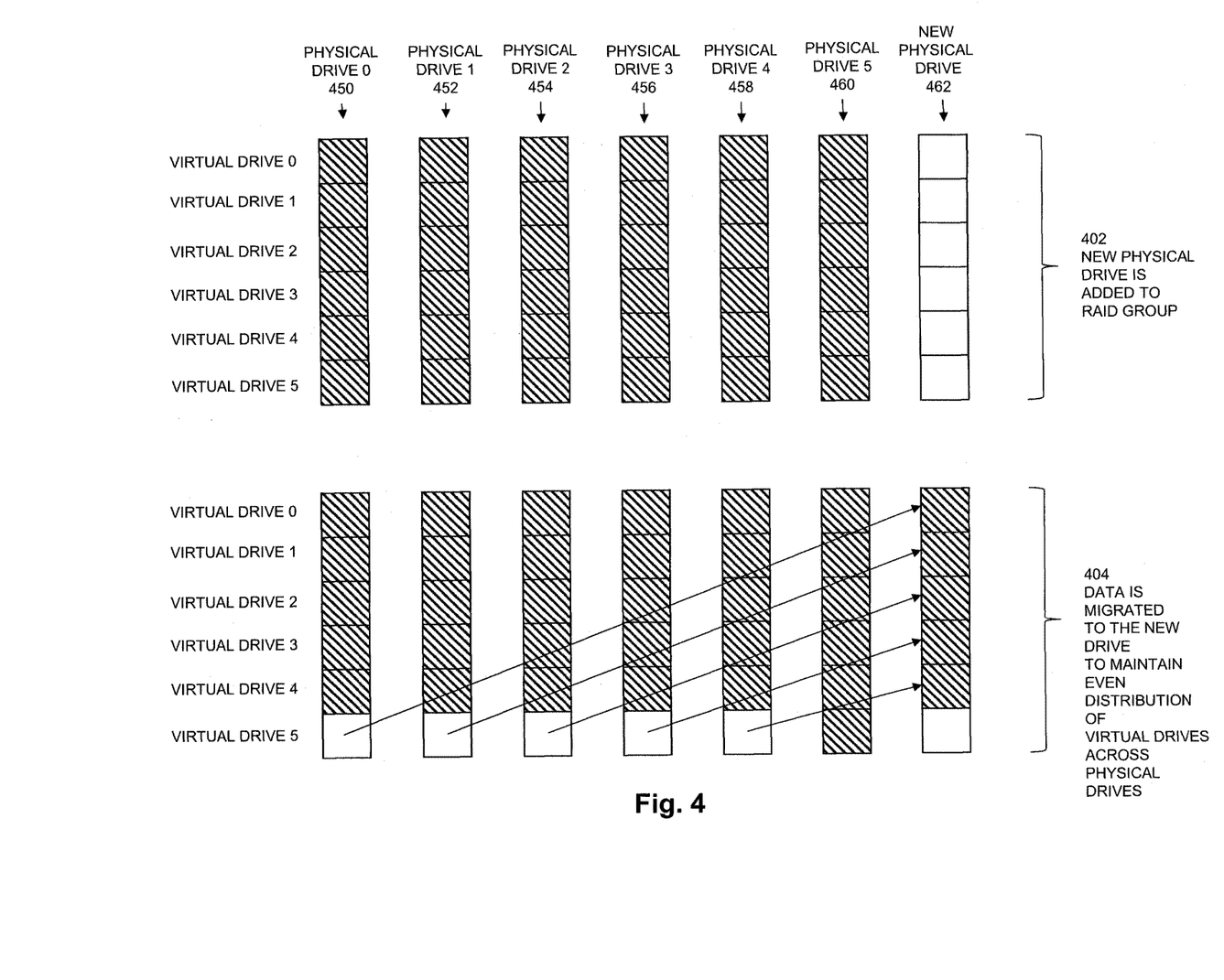
FIG. 4 is a block diagram illustrating even distribution of virtual drives across physical drives in a set of physical drives, addition of a single new physical drive to a set of physical drives to expand the capacity of the set of physical drives, and migrating data to the new physical drive such that the even distribution of virtual drives is maintained after addition of the new physical drive to the set of physical drives.

FIG. 4 is a block diagram illustrating even distribution of virtual drives across physical drives in a set of physical drives, addition of a single new physical drive to a set of physical drives to expand the capacity of the set of physical drives, and migrating data to the new physical drive such that even distribution of virtual drives is maintained even after addition of the new physical drive to the set of physical drives. In the example of FIG. 4, in the top half 402, a single New Physical Drive 462 is added to a set of physical drives that previously included only Physical Drive 0 450, Physical Drive 1 452, Physical Drive 2 454, Physical Drive 3 456, and Physical Drive 5 460. As shown in FIG. 4, at the time New Physical Drive 462 is added to the set of physical drives, the virtual drives are evenly distributed across the physical drives in the RAID group. Specifically, each one of Physical Drives 0-5 has been divided into six equal sized regions, which have each been allocated to corresponding virtual drives, e.g. into virtual drives 0-5 for each physical drive.

In response to detecting the addition of the New Physical Drive 462 to the set of physical drives, in the bottom half 404 of FIG. 4, data is migrated to New Physical Drive 462 to maintain an even distribution of virtual drives across the physical drives in the set of physical drives, even after addition of New Physical Drive 462. For example, virtual drive 5 from Physical Drive 0 450 (virtual drive 0,5), virtual drive 5 from Physical Drive 1 452 (virtual drive 1,5), virtual drive 5 from Physical Drive 2 454 (virtual drive 2,5), virtual drive 5 from Physical Drive 3 456 (virtual drive 3,5), and virtual drive 5 from Physical Drive 4 458 (virtual drive 4,5) are all moved to New Physical Drive 462. Note that virtual drive 5 from Physical Drive 5 460 (virtual drive 5,5) is not moved to New Physical Drive 462, since moving that virtual drive to New Physical Drive 462 would not increase the evenness of distribution of virtual drives across the physical drives in the set of physical drives. After the data has been migrated to the New Physical Drive 462 as shown in 404, the regions previously allocated to the virtual drives moved to New Physical Drive 462 can be allocated to new virtual drives, and then those new virtual drives can be assigned to RAID groups, e.g. one or more new RAID groups. When moving virtual drives to the New Physical Drive 462, and/or when assigning new virtual drives allocated from the regions freed up in physical drives 0-5, the disclosed techniques also ensure that for each RAID group, no two virtual drives assigned to the RAID group are allocated from the same physical drive.

Figure 5:
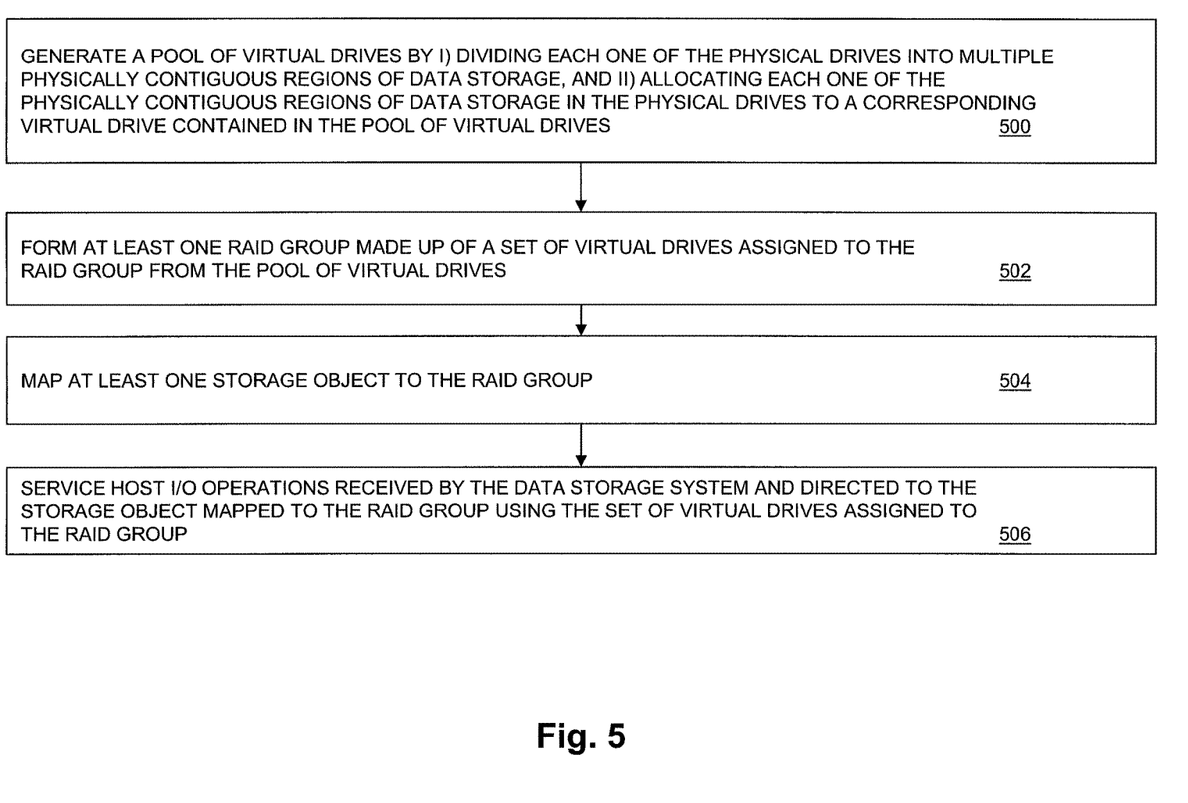
FIG. 5 is a flow chart illustrating steps performed in an illustrative embodiment to use virtual drives to provide RAID groups in a data storage system.

FIG. 5 is a flow chart illustrating steps performed in an illustrative embodiment to use virtual drives to provide RAID groups in a data storage system. The steps of FIG. 5 may, for example, be performed by the Host I/O Processing Logic 135 shown in FIG. 1.

As shown in FIG. 5, at step 500 a pool of virtual drives is generated by i) dividing each one of the physical drives in a set of physical drives into multiple physically contiguous regions of data storage, and ii) allocating each one of the physically contiguous regions of data storage in the physical drives to a corresponding virtual drive contained in the pool of virtual drives.

At step 502, at least one RAID group is formed that is made up of a set of virtual drives assigned to the RAID group from the pool of virtual drives. The pool of virtual drives provides a number of virtual drives that is equal to the width of the RAID group, while ensuring that no two virtual drives in the RAID group are allocated from the same physical drive.

At step 504, at least one storage object is mapped to the RAID group. The storage object may be a LUN, host file system, virtual volume, snapshot data object that is a point-in-time copy of another storage object, and/or some other type of storage object, which the data storage system makes accessible to the host computers for reading and/or writing.

At step 506, host I/O operations received by the data storage system and directed to the storage object mapped to the raid group are serviced using the set of virtual drives assigned to the RAID group.

Figure 6:
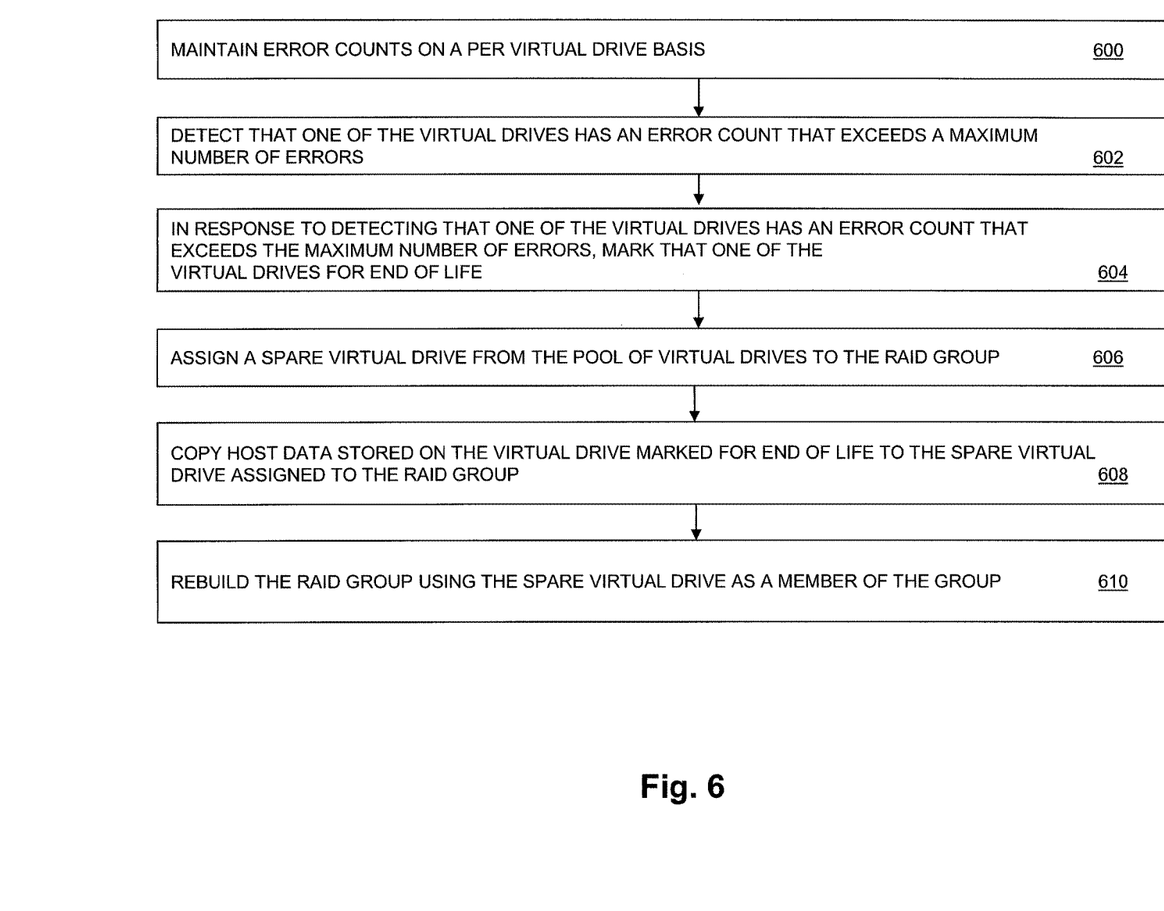
FIG. 6 is a flow chart illustrating steps performed in an illustrative embodiment to mark a virtual drive for end of life, assign a spare virtual disk from the pool of virtual disks to the RAID group to replace the virtual drive marked for end of life, copy host data to the virtual drive marked for end of life, and rebuild the RAID group using the spare virtual drive.

FIG. 6 is a flow chart illustrating steps performed in an illustrative embodiment to mark a virtual drive as end of life, assign a spare virtual disk from the pool of virtual disks to the RAID group to replace the virtual drive marked for end of life, copy host data to the virtual drive marked for end of life, and rebuild the RAID group using the spare virtual drive. The steps of FIG. 6 may, for example, be performed by the Host I/O Processing Logic 135 shown in FIG. 1.

At step 600, error counts are maintained a per-virtual drive basis, such that error counts are maintained for each virtual drive that is assigned to a RAID group, and where each error count is compared to a maximum number of errors that is acceptable.

At step 602, the Host I/O Processing Logic 135 detects that a virtual drive has an error count that exceeds the maximum acceptable number of errors.

In response to detecting at step 602 that a virtual drive has an error count that exceeds the maximum number of errors, at step 604 the Host I/O Processing Logic 135 marks that one of the virtual drives for end of life. For example, a data structure may be maintained that keeps a list of all virtual drives that have been marked for end of life.

At step 606, in response to the virtual drive being marked for end of life at step 604 (e.g. in response to the virtual drive being listed in the list of all virtual drives that are marked for end of life), Host I/O Processing Logic 135 assigns a spare virtual drive from the pool of virtual drives to the RAID group that contains the virtual drive that is marked for end of life. For example, a spare virtual drive may be requested from the pool of virtual drives for assignment to the RAID group that contains the virtual drive that is marked for end of life, and the pool of virtual drives may return a spare virtual drive for assignment to that RAID group, while also ensuring that the spare virtual drive provided from the pool of virtual drives is not allocated from the same physical drive as any of the virtual drives in that RAID group other than the virtual drive that is marked for end of life.

At step 608 the Host I/O Processing Logic 135 copies the host data stored on the virtual drive marked for end of life to the spare virtual drive assigned to the RAID group at step 606. The RAID group is then rebuilt using the spare virtual drive as a member of the RAID group at step 610, and without the virtual drive that was marked for end of life.

Figure 7:
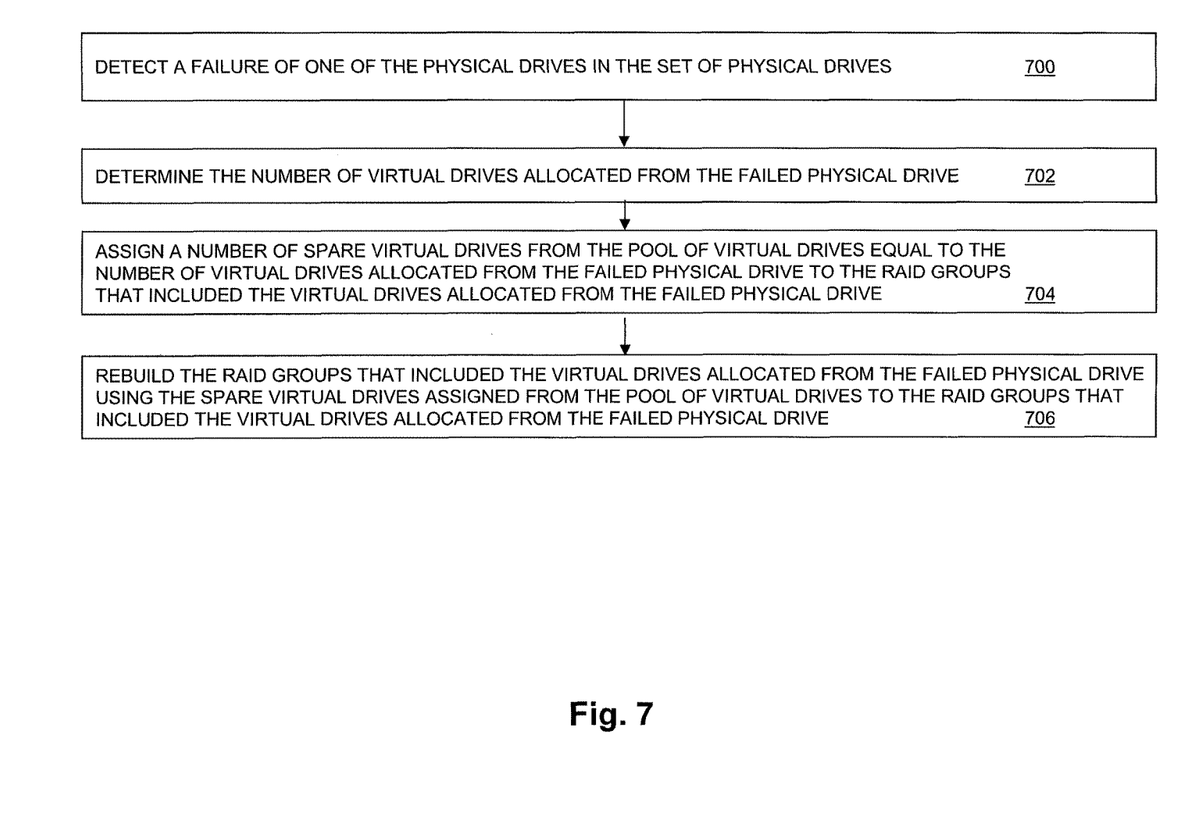
FIG. 7 is a flow chart illustrating steps performed in an illustrative embodiment to detect a failure of a physical drive, determine the number of virtual drives allocated from the failed physical disk, request the same number of spare virtual drives from the pool of virtual drives and assign the spare virtual drives to the RAID groups that contained the virtual drives that were allocated from the failed physical drive, and rebuild the RAID groups using the spare virtual drives assigned to the RAID groups in response to detecting the failure of the physical drive.

FIG. 7 is a flow chart illustrating steps performed in an illustrative embodiment to detect a failure of a physical drive in the set of physical drives, determine the number of virtual drives allocated from the failed physical disk, request the same number of spare virtual drives from the pool of virtual drives and assign the spare virtual drives to the RAID groups that contained the virtual drives that were allocated from the failed physical drive, and rebuild the RAID groups using the spare virtual drives assigned to the RAID groups in response to detecting the failure of the physical drive. The steps of FIG. 7 may, for example, be performed by the Host I/O Processing Logic 135 shown in FIG. 1.

At step 700, a failure is detected of one of the physical drives in the set of physical drives. In response to detecting the failure at step 700, at step 702 the Host I/O Processing Logic 135 determines the number of virtual drives allocated from the failed physical drive. At step 704 the Host I/O Processing Logic 135 assigns a number of spare virtual drives from the pool of virtual drives equal to the number of virtual drives allocated from the failed physical drive to the RAID groups that included the virtual drives allocated from the failed physical drive. For example, a number of spare virtual drives may be requested from the pool of virtual drives that is equal to the number of virtual drives allocated from the failed physical drive, and the pool of virtual drives may return that number of spare virtual drives for assignment to the RAID groups that included the virtual drives allocated from the failed physical drive. The pool of virtual drives may further ensure at step 704 that no spare virtual drive provided from the pool of virtual drives is assigned to a RAID group that includes another virtual drive that is allocated from the same physical drive as the spare virtual drive.

At step 706, Host I/O Processing Logic 135 rebuilds the RAID groups that included the virtual drives allocated from the failed physical drive using the spare virtual drives assigned from the pool of virtual drives to the RAID groups that included the virtual drives allocated from the failed physical drive.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A data storage system that uses virtual drives to provide RAID (Redundant Arrays of Independent Disks) groups, comprising:
   at least one storage processor including processing circuitry and a memory;
   a set of physical drives communicably coupled to the storage processor; and
   wherein the storage processor is configured to
      generate a pool of virtual drives by i) dividing each one of the physical drives into a plurality of regions of physically contiguous non-volatile data storage, and ii) allocating individual ones of the regions of physically contiguous non-volatile data storage in the physical drives to corresponding ones of a plurality of virtual drives contained in the pool of virtual drives,
      form at least one RAID group made up completely of a set of multiple virtual drives assigned to the RAID group from the pool of virtual drives,
      map at least one storage object to the RAID group, and
      service host I/O operations received by the storage processor of the data storage system from a separate host computer device and directed to the storage object mapped to the RAID group at least in part by the storage processor storing host data that is indicated by the received host write I/O operations in the received host I/O operations in the regions of physically contiguous non-volatile data storage in the physical drives of the data storage system that were allocated to the set of multiple virtual drives assigned to the RAID group.

2. The data storage system of claim 1, wherein to forming the at least one RAID group made up of the set of virtual drives assigned to the RAID group from the pool of virtual drives the storage processor is further configured to:
   select the set of virtual drives assigned to the RAID group such that each one of the virtual drives in the set of virtual drives assigned to the RAID group is located on a different one of the physical drives.

3. The data storage system of claim 1, wherein the storage processor is further configured to:
   maintain error counts on a per virtual drive basis;
   detect that one of the virtual drives has an error count that exceeds a predetermined maximum number of errors; and
   in response to detecting that one of the virtual drives has an error count that exceeds the predetermined maximum number of errors, mark that one of the virtual drives for end of life.

4. The data storage system of claim 3, wherein the storage processor, in response to the one of the virtual drives being marked for end of life, is further configured to:

assign a spare virtual drive from the pool of virtual drives to the RAID group;

copy host data stored on the virtual drive marked for end of life to the spare virtual drive assigned to the RAID group; and rebuild the RAID group using the spare virtual drive as a member of the group.

5. The data storage system of claim 1, wherein the at least one RAID group comprises a plurality of RAID groups, and wherein the storage processor is further configured to:

detect a failure of one of the physical drives in the set of physical drives;

in response to detecting the failure of the physical drive,
i) determine a number of virtual drives allocated from the failed physical drive,
ii) assign a number of spare virtual drives from the pool of virtual drives equal to the number of virtual drives allocated from the failed physical drive to the ones of the RAID groups that included the virtual drives allocated from the failed physical drive, and
iii) rebuild the RAID groups that included the virtual drives allocated from the failed physical drive using the spare virtual drives assigned from the pool of virtual drives to the RAID groups that included the virtual drives allocated from the failed physical drive.

6. The data storage system of claim 1, wherein the virtual drives are evenly distributed across the physical drives in the set of physical drives, and wherein the storage processor is further configured to:

add a new physical drive to the set of physical drives; and in response to the new physical drive being added to the set of physical drives, migrate data to the new physical drive such that an even distribution of virtual drives is maintained across the physical drives in the set of physical drives.

7. The data storage system of claim 6, further comprising:

wherein to divide each one of the physical drives into the plurality of regions of physically contiguous non-volatile data storage the storage processor is configured to divide each one of the physical drives into a plurality of equal sized regions of physically contiguous non-volatile data storage, such that each one of the virtual drives has the same size; and wherein the physical drives in the set of physical drives have different capacities.

8. The data storage system of claim 1, wherein the at least one RAID group comprises a plurality of RAID groups, and wherein the storage processor is further configured to:

generate a set of spare virtual drives in the pool of virtual drives; and wherein the set of spare virtual drives is shared across the plurality of RAID groups.

9. A method of using virtual drives to provide RAID (Redundant Arrays of Independent Disks) groups in a data storage system, wherein the data storage system includes a storage processor and a set of physical drives communicably coupled to the storage processor, the method comprising:

generating a pool of virtual drives by i) dividing each one of the physical drives into a plurality of regions of physically contiguous non-volatile data storage, and ii) allocating individual ones of the regions of physically contiguous non-volatile data storage in the physical drives to corresponding ones of a plurality of virtual drives contained in the pool of virtual drives;

forming at least one RAID group made up completely of a set of multiple virtual drives assigned to the RAID group from the pool of virtual drives;

mapping at least one storage object to the RAID group; and servicing host I/O operations received by the storage processor of the data storage system from a separate host computing device and directed to the storage object mapped to the RAID group at least in part by the storage processor storing host data that is indicated by received host write I/O operations in the received host I/O operations into the regions of physically contiguous non-volatile data storage in the physical drives of the data storage system that were allocated to the set of multiple virtual drives assigned to the RAID group.

10. The method of claim 9, wherein forming at least one RAID group made up of the set of virtual drives assigned to the RAID group from the pool of virtual drives includes selecting the set of virtual drives assigned to the RAID group such that each one of the virtual drives in the set of virtual drives assigned to the RAID group is located on a different one of the physical drives.

11. The method of claim 9, further comprising:

maintaining error counts on a per virtual drive basis;

detecting that one of the virtual drives has an error count that exceeds a predetermined maximum number of errors; and in response to detecting that one of the virtual drives has an error count that exceeds the predetermined maximum number of errors, marking that one of the virtual drives for end of life.

12. The method of claim 11, the method further comprising, in response to marking the one of the virtual drives for end of life:

assigning a spare virtual drive from the pool of virtual drives to the RAID group;

copying host data stored on the virtual drive marked for end of life to the spare virtual drive assigned to the RAID group; and rebuilding the RAID group using the spare virtual drive as a member of the group.

13. The method of claim 12, further comprising:

wherein after the at least one RAID group has been formed the pool of virtual drives contains a plurality of spare virtual drives; and wherein marking the one of the virtual drives having an error count that exceeds the predetermined maximum count of errors comprises adding the one of the virtual drives having the error count that exceeds the predetermined maximum count of errors to a list of all virtual drives that have been marked for end of life.

14. The method of claim 13, wherein the step of assigning the spare virtual drive from the pool of virtual drives to the RAID group is performed responsive to the one of the virtual drives having the error count that exceeds the predetermined maximum count of errors being added to the list of all virtual drives that have been marked for end of life, and further comprises i) selecting a spare virtual drive from the plurality of spare virtual drive in the pool of virtual drives such that the selected spare virtual drive is located on a physical drive that is different from all of the physical drives from which the virtual drives in the RAID group other than the virtual drive that is marked for end of life are allocated, and ii) assigning the selected spare virtual drive to the RAID group to replace the virtual drive that is marked for end of life.

15. The method of claim 9, wherein the at least one RAID group comprises a plurality of RAID groups, and wherein the method further comprises:
  detecting a failure of one of the physical drives in the set of physical drives;
  in response to detecting the failure of the physical drive,
    i) determining a number of virtual drives allocated from the failed physical drive,
    ii) assigning a number of spare virtual drives from the pool of virtual drives equal to the number of virtual drives allocated from the failed physical drive to the ones of the RAID groups that included the virtual drives allocated from the failed physical drive, and
    iii) rebuilding the RAID groups that included the virtual drives allocated from the failed physical drive using the spare virtual drives assigned from the pool of virtual drives to the RAID groups that included the virtual drives allocated from the failed physical drive.

16. The method of claim 9, further comprising:
  wherein the virtual drives are evenly distributed across the physical drives in the set of physical drives;
  adding a new physical drive to the set of physical drives;
  in response to the new physical drive being added to the set of physical drives, migrating data to the new physical drive such that an even distribution of virtual drives is maintained across the physical drives in the set of physical drives.

17. The method of claim 16, further comprising:
  wherein dividing each one of the physical drives into the plurality of regions of physically contiguous non-volatile data storage comprises dividing each one of the physical drives into a plurality of equal sized regions of physically contiguous non-volatile data storage, such that each one of the virtual drives has the same size; and
  wherein the physical drives in the set of physical drives have different capacities.

18. The method of claim 9, wherein the at least one RAID group comprises a plurality of RAID groups, and wherein the method further comprises:
  generating a set of spare virtual drives in the pool of virtual drives; and
  wherein the set of spare virtual drives is shared across the plurality of RAID groups.

19. A computer program product, comprising:
  a non-transitory computer readable medium storing program code for using virtual drives to provide RAID (Redundant Arrays of Independent Disks) groups in a data storage system, wherein the data storage system includes a storage processor and a set of non-volatile data storage devices communicably coupled to the storage processor, the set of instructions, when carried out by at least one processor in the storage processor, causing the storage processor to perform a method of:
  generating a pool of virtual drives by i) dividing each one of the physical drives into a plurality of regions of physically contiguous non-volatile data storage, and ii) allocating individual ones of the regions of physically contiguous non-volatile data storage in the physical drives to corresponding ones of a plurality of virtual drives contained in the pool of virtual drives;
  form at least one RAID group made up completely of a set of multiple virtual drives assigned to the RAID group from the pool of virtual drives;
  map at least one storage object to the RAID group; and
  service host I/O operations received by the storage processor of the data storage system from a separate host computing device and directed to the storage object mapped to the RAID group at least in part by the storage processor storing host data that is indicated by received host write I/O operations in the received host I/O operations into the regions of physically contiguous non-volatile data storage in the physical drives of the data storage system that were allocated to the set of multiple virtual drives assigned to the RAID group.

* * * * *